(12) United States Patent
Moriwaki et al.

(10) Patent No.: US 8,023,499 B2
(45) Date of Patent: Sep. 20, 2011

(54) COMMUNICATION NETWORK CONTROL SYSTEM, COMMUNICATION TERMINAL, AND COMMUNICATION NETWORK CONTROL METHOD

(75) Inventors: Tetsuro Moriwaki, Saitama (JP); Keiichi Hibi, Matsudo (JP); Shohei Yamada, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1040 days.

(21) Appl. No.: 11/884,310

(22) PCT Filed: Feb. 15, 2006

(86) PCT No.: PCT/JP2006/002602
§ 371 (c)(1),
(2), (4) Date: Aug. 14, 2007

(87) PCT Pub. No.: WO2006/088035
PCT Pub. Date: Aug. 24, 2006

(65) Prior Publication Data
US 2010/0157882 A1 Jun. 24, 2010

(51) Int. Cl.
*H04L 12/50* (2006.01)
(52) U.S. Cl. .................. 370/360; 370/401; 370/402
(58) Field of Classification Search .............. 370/310.2, 370/328, 338, 401, 402, 360, 230, 235, 389, 370/386, 385, 373, 395, 3
See application file for complete search history.

(56) References Cited

U.S. PATENT DOCUMENTS

| 2004/0243715 A1 | 12/2004 | Yokoyama | |
| 2005/0021598 A1* | 1/2005 | Dunlop et al. | 709/202 |

FOREIGN PATENT DOCUMENTS

| JP | 2002-64562 A | 2/2002 |
| JP | 2004-32204 A | 1/2004 |
| JP | 2004-336310 A | 11/2004 |
| JP | 2004-356922 A | 12/2004 |

OTHER PUBLICATIONS

Takayuki Warabino et al., Information Processing Society of Japan Kenkyu Hokoku, vol. 2003, No. 114, Nov. 14, 2003, pp. 105-112.
Koichi Takasugi et al., Transactions of Information Processing Society of Japan, vol. 46, No. 2, Feb. 15, 2005, pp. 608-623.
Takao Nakanishi et al., NTT R&D, vol. 52, No. 3, Mar. 10, 2003, pp. 223-230.
Yabusaki et al., NTT DoCoMo Technical Journal vol. 10, No. 4 Jan. 2003, pp. 6-34.
Imai et al., 4th CINAG symposium, 2002, pp. 112-113.
Kaneko et al., 4th CINAG symposium, 2002, pp. 114-115.

* cited by examiner

*Primary Examiner* — Brenda Pham
(74) *Attorney, Agent, or Firm* — Birch, Stewart, Kolasch & Birch, LLP

(57) ABSTRACT

To guarantee continuation of communications of the level of the applications, and implement smooth and seamless switching between communication terminals that execute the service.

Provided are mobility management means (120) for performing call control and the like, service management means (130) for managing a session while controlling a start, suspension, resuming and releasing of session connection, and exerted are a function of receiving a switching request signal from the communication terminal of a switching source, and instructing the mobility management means (120) to perform call connection to the communication terminal of a switching destination that does not perform communications, another function of notifying the communication terminal of the switching destination of state information of the session executed between a communicating-apparatus communication terminal and the communication terminal of the switching source, and still another function of establishing new session connection between the communication terminal of the switching destination and the communicating-apparatus communication terminal.

13 Claims, 7 Drawing Sheets

COMMUNICATION NETWORK CONTROL SYSTEM, COMMUNICATION TERMINAL, AND COMMUNICATION NETWORK CONTROL METHOD

TECHNICAL FIELD

The present invention relates to a control technique of a communication network for providing mobile communication service, and more particularly, to a communication network control system, communication terminal, and communication network control method having a function to perform a shift of service between communication terminals so as to continue the service seamlessly when a user changes a communication terminal used in the service to a different terminal during the use.

BACKGROUND ART

In recent years, with rapid expansion in diffusion of network services typified by the Internet and cellular telephones, expectations have been placed on realization of more sophisticated communication services. In the cellular telephones, the so-called handover function and mobility management function have been provided such that communications are continued when a user moves while bringing a terminal. By further developing the functions to be more sophisticated, actualization and the like are desired of functions for enabling communications to be continued when the terminal is changed during the communication so as to maintain the consistent service.

When communication networks have been expanded and developed and various kinds of communication terminals can connect to the communication networks, users have many types of communication terminals connectable to the communication networks. As these communication terminals, not only portable terminals such as cellular telephones, but also stationary apparatuses such as, for example, TV receivers and the like installed in the home are expected to function as communication terminals.

Meanwhile, by providing the common IP backbone using IP (Internet Protocol) communication techniques constructed by development of the Internet on the communication network side, it is possible to receive common services in various kinds of communication terminals without much concern for differences in access means such as wireless, cable and the like, operators of the networks, and service providers.

Under such circumstances, a user uses communication terminals such as, for example, a cellular telephone, PDA, personal computer, TV receiver and the like that the user has separately without restraint corresponding to his/her own status, and such a requirement arises that the user wants to use the same service using a communication terminal that the user has and selects at this point.

Further, such a case is expected that the user switches the communication terminal being used to another communication terminal while continuing the service. In this case, it is necessary to achieve user demand for shifting the communication state to another terminal seamlessly while maintaining the communication state to use the service continuously, without disconnecting communications once and newly connecting from another communication terminal. More specifically, there is an example that a user uses the service for receiving image content in streaming distribution at a personal computer at home, and when going out, switches the reception terminal to a portable communication terminal such as a cellular telephone, PDA or the like to bring away from home so as to use the same service continuously. Further, another example is considered that a user uses video telephone service away from home, gets home while communicating with the communicating apparatus, shifts the service to a TV receiver at home, and continues the video telephone service with the communicating apparatus.

In implementing seamless switching between communication terminals as described above, when the communication service is multi-cast type distribution and the like, since data of the same content is simultaneously distributed from a communication terminal on the distribution side to a plurality of (an indefinite number of) communication terminals, the user is only required to connect the switched reception terminal to the terminal on the distribution side to receive the data in the reception terminal, and is capable of implementing switching between communication terminals relatively with ease.

However, in uni-cast type communication where specific data is distributed to some specific communication terminal or one-to-one communication, the user needs procedures for once instructing to a communication terminal on the distribution side to suspend communications, connecting to the distribution-side terminal from a desired switched terminal, notifying switching of the reception-side terminal, and resuming the communications.

FIG. 6 shows an example of switching between communication terminals in such a conventional communication network control system. In this example, such a case is shown that during communications of a communication terminal #1 with a server apparatus X, the user switches the communication terminal #1 being used in the communications to a communication terminal #2. In this case, first, the user transmits control information shown by arrow 101 to the server apparatus X on the data distribution side from the communication terminal #1 receiving the data, and instructs to suspend distribution. Next, the user transmits control information shown by arrow 102 for requesting disconnection from the server apparatus X to a control apparatus Y on the communication network, and disconnects the communications.

Then, the user designates address information of the same server apparatus X as in the foregoing as shown by arrow 103 to the control apparatus Y of the communication network from the communication terminal #2 of a switching destination, and transmits a connection request. The control apparatus Y sets a communication path between the communication terminal #2 and server apparatus X on the communication network, and further sets connection between the apparatus X and terminal #2. Subsequently, when the communication terminal #2 transmits control information shown by arrow 104 for instructing to resume the distribution to the server apparatus X, the server apparatus X transmits the data of from the time the distribution is suspended, and the user is thereby capable of receiving subsequent data using the communication terminal #2 and thus implementing switching between terminals to use the service.

Herein, the address information of the server apparatus X for the communication terminal #2 of the switching destination to connect to the server apparatus X is designated with means for the user to operate the communication terminal #2 to input and the like in a form of a telephone number, URL or the like. In this example, the control apparatus Y of the communication network only performs connection and disconnection between the communication terminal #1 or #2 and the server apparatus X, and does not have the control function to switch between terminals, and switching between terminals is achieved by functions of suspending and resuming communications in the communication terminals and server apparatus.

FIG. 7 shows a conventional example of another method of switching between communication terminals. This example also shows the case during communications of the communication terminal #1 with the server apparatus X, the user switches the communication terminal #1 being used in the communications to the communication terminal #2. In switching, the communication terminal #1 on the reception side transmits control information to instruct to suspend distribution to the server X on the distribution side as shown by arrow 201. After suspending communications with the server X, when user performs transfer operation, the communication terminal #1 transmits control information for suspending connection to the server apparatus X, establishing connection of the communication terminal #2, and requesting transfer of the communications to the control apparatus Y of the communication network as shown by arrow 202.

The control apparatus Y receiving the control information transmits control information for instructing to connect to the server apparatus X to the communication terminal #2 as shown by arrow 203 and thereby places a call to the communication terminal #2, and when the communication terminal #2 responds to the call as shown by arrow 204, the communication channel is set between communication terminal #2 and server apparatus X to establish connection.

Subsequently, by transmission and reception of the control information between the communication terminal #1 of a transfer source and control apparatus Y as shown by arrow 205, the connection between the communication terminal #1 and server apparatus X is disconnected, and the communication terminal #2 transmits control information shown by arrow 206 for requesting to resume suspended communications to the server apparatus X, and thus receives subsequent data.

In this example, the control apparatus Y on the communication network has the control function of setting call connection to another terminal to transfer, but does not have the function of controlling suspension and resuming of data transmission/reception between the communication terminal and server apparatus, not guaranteeing continuation of communications i.e. seamless switching.

Further, in this example, the control apparatus Y on the communication network only transfers call connection from one communication terminal to another communication terminal, while neither considering the speech reproduction capability and display capability of the communication terminal #2 of the switching destination nor converting to a content form suitable for the capability, and therefore, the user needs to request conversion to content data suitable for the terminal capability to the server apparatus X from the communication terminal #2 of the transfer destination.

Non-patent Document 1: Yabusaki et al. "Story on Mobile Network All-IP" NTT DoCoMo Technical Journal Vol. 10, No. 4 January, 2003, P. 6-34

Non-patent Document 2: Imai et al. "Service handoff mechanism to achieve ubiquitous applications", 4th CINAG symposium, 2002, P. 112-113

Non-patent Document 3: Kaneko et al. "Session layer mobility support for dynamic network service", 4th CINAG symposium, 2002, P. 114-115

DISCLOSURE OF INVENTION

Problems to be Solved by the Invention

However, in both the above-mentioned conventional examples, in switching between communication terminals used in service, continuation is reserved only by suspension and resuming of communications between the communication terminal and a server apparatus of a communicating apparatus i.e. between the end and end, and the seamless service is not ensured. In other words, the server apparatus X is provided with the function of suspending communications i.e. data transmission, another communication terminal requests to resume data transmission after suspension, and switching between terminals is thus implemented seemingly.

In the case of distributing the content stored in the server apparatus to a communication terminal only one direction, or performing bidirectional real-time communication in one-to-one such as a video telephone by such a function, seamless switching between terminals can be ensured to some extent. However, when an upper communication application has a state corresponding to data transmission, for example, in the case of continuing a communications game while switching from some communication terminal to another communication terminal, or performing joint operations for a plurality of communication terminals to edit the same document while communicating with one another, there is a problem that it is difficult to notify the state of the communication application to a communication terminal to which the service is transferred.

In other words, even in services such as video telephone and content distribution, when a plurality of communications (connections) is set between end-end applications such as an application used by a number of media at the same time, an application used in conjunction with various kinds of content and information, there is a problem that processing for switching from a communication terminal in communication to another communication and setting procedures are complicated.

Further, there is another problem that it is difficult to provide services in conjunction with communication network control such that the service quality (bit rate, delay and the like) provided by the network is controlled suitably to receive content in optimal communication forms (bit rate, resolution and the like) according to capabilities of a communication terminal corresponding to switching to the communication terminal.

The present invention is carried out in view of such circumstances, and it is an object of the invention to provide a communication network control system, communication terminal, and communication network control method which solve the above-mentioned problems by functions of managing and controlling call connection to a switching-destination communication terminal and a session that is a logical transmission path between end-end applications, in the communication network control system, without user being aware of work of the operation in switching from a reception-side communication terminal receiving data to another communication terminal, guarantee continuation of communications of the level of the applications, implement smooth and seamless switching between communication terminals that execute the service, are easy to work with other control/management sections provided on the communication network, thereby able to implement the advanced sophisticated communication service with ease, and which are rich in expandability and flexibility.

Further, it is another object of the invention to achieve a communication network control system, communication terminal, and communication network control method capable of implementing switching between terminals while keeping states without making the processing in communication terminals and server apparatus complicated in applications requiring complicated communication modes and complicated state management, by providing functions of notifying a switching-destination communication terminal of the states of the session and communication application from a communication terminal prior to switching or the communication network control system, and thus providing various kinds of advanced applications and communication service.

Means for Solving the Problem (1) To achieve the above-mentioned objects, the present invention takes following means. In other words, a communication network control system according to the invention is a communication network control system for switching at least one communication terminal that performs communications to another communication terminal that does not perform the communications without suspending the communications, and thus controlling the communications to be continued, and is characterized by having mobility management means for setting a physical and logical transmission path between communication terminals, and at least controlling a data packet transfer path and a call to the communication terminal, and service management means for managing a session that is a state where data communications are established between applications of the communication terminals on the transmission path, while controlling a start, suspension, resuming and releasing of session connection, where the service management means exerts a function of receiving a switching request signal from the communication terminal of a switching source that performs the communications, and instructing the mobility management means to perform call connection to the communication terminal of a switching destination that does not perform the communications, another function of notifying the communication terminal of the switching destination of state information of the session executed between a communicating-apparatus communication terminal and the communication terminal of the switching source, and still another function of establishing new session connection between the communication terminal of the switching destination and the communicating-apparatus communication terminal.

Thus, on the communication network, in addition to the function of setting and managing the data transmission path, exerted are the function of managing and controlling the physical logical transmission path of end-end session i.e. between applications using the transmitted data, and the function of notifying the session state prior to switching to the switching-destination communication terminal. It is thus possible to implement smooth and seamless switching between communication terminals including state management of the session and application. Further, it is made ease to work with other management and control functions provided on the communication network, and it is thereby possible to realize advanced sophisticated communication service with ease, and to enhance the expandability and flexibility. Furthermore, by beforehand notifying the switching-destination communication terminal of transfer of the session to confirm, the switching-destination communication terminal prepares for receiving the transferred session, or the session is not transferred to the switching-destination communication terminal occupied by another processing, and it is thus possible to implement smooth reliable switching according to circumstances.

(2) Further, a communication network control system according to the invention is a communication network control system for switching at least one communication terminal that performs communications to another communication terminal that does not perform the communications without suspending the communications, and thus controlling the communications to be continued, and is characterized by having mobility management means for setting a physical and logical transmission path between communication terminals, and at least controlling a data packet transfer path and a call to the communication terminal, and service management means for managing a session that is a state where data communications are established between applications of the communication terminals on the transmission path, while controlling a start, suspension, resuming and releasing of session connection, where the mobility management means exerts a function of receiving a signal requesting call connection including a request of switching from the communication terminal of the switching source from the communication terminal of the switching destination that does not perform the communications, and performing call connection of the communication terminal of the switching destination, while the service management means exerts a function of receiving a switching request signal from the communication terminal of the switching source that performs the communications, another function of notifying the communication terminal of the switching destination of state information of the session executed between a communicating-apparatus communication terminal and the communication terminal of the switching source, and still another function of establishing new session connection between the communication terminal of the switching destination and the communicating-apparatus communication terminal.

Thus, on the communication network, in addition to the function of setting and managing the data transmission path, exerted are the function of managing and controlling the physical logical transmission path of end-end session i.e. between applications using the transmitted data, and the function of notifying the session state prior to switching to the switching-destination communication terminal. It is thus possible to implement smooth and seamless switching between communication terminals including state management of the session and application. Further, it is made ease to work with other management and control functions provided on the communication network, and it is thereby possible to realize advanced sophisticated communication service with ease, and to enhance the expandability and flexibility. Furthermore, since the communication terminal of the switching destination requests call connection to the communication network, it is possible to implement smooth reliable switching of the switching-destination communication terminal already having prepared for reception of the session scheduled to be transferred.

(3) Further, in the communication network control system according to the invention, the service management means is characterized by exerting a function of analyzing a state of the session already established between the communicating-apparatus communication terminal and the communication terminal of the switching source based on the state information of the session received from the communication terminal of the switching source or the state information of the session managed by the management means, and determining whether switching to the communication terminal of the switching destination is allowed or not, and another function of notifying the communication terminal of the switching destination of the state information of the session already established between the communicating-apparatus communication terminal and the communication terminal of the switching source.

Thus, since whether switching to the communication terminal of the switching destination is allowed or not is determined, it is possible to change the session state to another session state corresponding to processing capabilities of the switching destination terminal and transmission capabilities of the communication network. It is thereby possible to implement smooth seamless terminal switching guaranteeing continuation of the level of the applications. Further, as well as the function of controlling the data transmission path on the communication network, exerted are the function of managing and controlling the state of the physical logical transmission path of end-end session i.e. between applications using the transmitted data, and the function of notifying the session state. It is thus possible to implement smooth and seamless switching between communication terminals including state management of the session and application.

(4) Further, in the communication network control system according to the invention, the state information of the session includes at least one of information indicating a bit rate, media type, codec type, and elapsed time of session connection, as states of the session and an application already established between the communicating-apparatus communication terminal and the communication terminal of the switching source.

Since the session state information is notified that includes such information, it is possible to establish a session corresponding to the type, attribute and processing capabilities of the communication terminal of the switching destination, while determining whether switching to the communication terminal of the switching destination is allowed or not.

(5) Further, in the communication network control system according to the invention, the service management means is characterized by exerting a function of analyzing processing capabilities and usable applications of the communication terminal of the switching destination based on terminal information of the communication terminal of the communication destination received from the communication terminal of the switching source, determining whether switching to the communication terminal of the switching destination is allowed or not, and when the switching is allowed, selecting an application suitable for the communication terminal of the switching destination to perform session connection with the application.

Thus, analyzed are processing capabilities and usable applications of the communication terminal of the switching destination, determined is whether switching to the communication terminal of the switching destination is allowed or not, and when the switching is allowed, selected is an application suitable for the communication terminal of the switching destination. It is thereby possible to implement switching between communication terminals irrespective of whether the communication terminal of the switching destination is the same type or a different type as/from that of the communication terminal of the switching source.

(6) Further, in the communication network control system according to the invention, the service management means is characterized by exerting a function of acquiring terminal information including information indicating processing capabilities of the communication terminal by searching an attribute of the communication terminal of the switching destination, analyzing processing capabilities and usable applications of the communication terminal of the switching destination based on the acquired terminal information, determining whether switching to the communication terminal of the switching destination is allowed or not, and when the switching is allowed, selecting an application suitable for the communication terminal of the switching destination to perform session connection with the application.

Thus, processing capabilities and usable applications of the communication terminal of the switching destination are analyzed based on the terminal information acquired in the control system, whether switching to the communication terminal of the switching destination is allowed or not is determined, and when the switching is allowed, an application is selected that is suitable for the communication terminal of the switching destination. It is thereby possible to implement switching between terminals, even without supplementary information such as the state information of the session provided from the communication terminal, terminal information indicating the terminal capabilities of the communication terminal of the switching destination and the like. Further, it is possible to implement switching between communication terminals irrespective of whether the communication terminal of the switching destination is the same type or a different type as/from that of the communication terminal of the switching source.

(7) Further, in the communication network control system according to the invention, the service management means is characterized by exerting a function of analyzing a traffic status of the communication network, or usage or vacant status of network resources, and determining whether to switch one of communication terminals that perform the communications to another communication terminal that does not perform the communications.

According to this configuration, it is possible on the communication network side to determine whether to perform communications with another communication terminal that does not perform the communications corresponding to the status of usable or available resources, without the communication terminal transmitting a switching request signal to the communication network. For example, when a first communication terminal is a communication terminal such as a cellular telephone or the like which is limited in data processing capability to some extent and affected greatly by circumstances of transmission resources such as radio propagation path conditions, and a second communication terminal is a communication terminal such as a personal computer or the like which is higher in data processing capabilities and capable of using broadband wire transmission resources, by determination on the communication network side, it is possible to set session connection with the second communication terminal to transfer the session. Further, it is possible to use resources to set session connection, after checking the traffic on the communication network and usage or vacant status of transmission resources and confirming available resources.

(8) Further, a communication terminal according to invention is a communication terminal that performs communications via a communication network control system comprising mobility management means for setting a physical and logical transmission path between communication terminals, and at least controlling a data packet transfer path and a call to the communication terminal, and service management means for managing session that is a state where data communications are established between applications of the communication terminals on the transmission path, while controlling a start, suspension, resuming and releasing of session connection, and is characterized by comprising call control means for requesting call connection to a communicating-apparatus communication terminal to the communication network control system, session control means for requesting setting of session connection to an application on the communicating-apparatus communication terminal, session management means for managing states of a session and an application, and terminal switching request means for requesting switching to another communication terminal that does not perform communications to the communication network control system, where in requesting the switching, the terminal switching request means notifies the communication network control system of state information of the session and the application of the communication terminal that the session management means manages.

Thus, whenever requesting switching, the state information of the session and the application of the communication terminal that the session management means manages is notified to the communication network control system. Therefore, in the communication network control system, it is possible to implement smooth and seamless switching between communication terminals including state management of the session and application. Further, it is made ease to work with other management and control functions provided on the communication network, and it is thereby possible to realize advanced sophisticated communication service with ease, and to enhance the expandability and flexibility.

(9) Further, a communication terminal according to invention is a communication terminal that performs communications via a communication network control system comprising mobility management means for setting a physical and logical transmission path between communication terminals, and at least controlling a data packet transfer path and a call to the communication terminal, and service management means for managing session that is a state where data communications are established between applications of the communication terminals on the transmission path, while controlling a start, suspension, resuming and releasing of session connection, and is characterized by comprising call control means for requesting call connection to a communicating-apparatus communication terminal to the communication network control system, session control means for requesting setting of session connection to an application on the communicating-apparatus communication terminal, session management means for managing states of a session and an application, and state setting means for setting states of the session and the application based on state information of the session notified from the communication network control system, where the session control means establishes session connection based on the set states of the session and the application.

Thus, in the communication terminal, states of the session and the application are set based on the state information of the session notified from the communication network control system, session connection is established based on the set states of the session and the application, and it is thus possible to implement smooth and seamless switching between communication terminals including state management of the session and application.

(10) Further, a communication terminal according to invention is a communication terminal that performs communications via a communication network control system comprising mobility management means for setting a physical and logical transmission path between communication terminals, and at least controlling a data packet transfer path and a call to the communication terminal, and service management means for managing a session that is a state where data communications are established between applications of the communication terminals on the transmission path, while controlling a start, suspension, resuming and releasing of session connection, and is characterized by comprising call control means for requesting call connection to a communicating-apparatus communication terminal to the communication network control system, session control means for requesting setting of session connection to an application on the communicating-apparatus communication terminal, session management means for managing states of a session and an application, and short-distance communication means for transmitting a switching preparation request signal to a communication terminal of a switching destination without through the communication network in switching to another communication terminal that does not perform the communications, where after the short-distance communication means transmits the switching preparation request signal and terminal information is received from the communication terminal of the switching destination, the session control means transmits a switching request signal for the communication terminal of the switching destination including information on the states of the session and the application managed by the session management means to the communication network control system.

Thus, the short-distance communication means transmits a switching preparation request signal to a communication terminal of a switching destination without through the communication network, and after receiving a response signal including the terminal information form the communication terminal of the switching destination, the session control means transmits a switching request signal including the information on the states of the session and the application managed by the session management means to the communication network control system. It is thereby possible to implement smooth and seamless switching between communication terminals including state management of the session and application.

(11) Further, in the communication terminal according to the invention, the terminal information is attribution information including at least one of an identification number specific to the communication terminal of the switching destination, a form of the communication terminal, an application usable at the time the switching preparation request signal is received, media type, codec type, transmission capacity, and processing capabilities.

Since such terminal information is notified, in the communication network control system, it is possible to establish a session corresponding to the type, attribute and processing capabilities of the communication terminal of the switching destination, while determining whether switching to the communication terminal of the switching destination is allowed or not.

(12) Further, a communication network control method according to the invention is a communication network control method for switching at least one communication terminal that performs communications to another communication terminal that does not perform the communications without suspending the communications, and thus controlling the communications to be continued, using a communication network control system provided with mobility management means for setting a physical and logical transmission path between communication terminals, and at least controlling a data packet transfer path and a call to the communication terminal, and service management means for managing a session that is a state where data communications are established between applications of the communication terminals on the transmission path, while controlling a start, suspension, resuming and releasing of session connection, and is characterized by including the steps of transmitting, in the at least one communication terminal that performs the communications, a switching request signal for a communication terminal of a switching destination that does not perform the communications including information on a session, a state of a communication application and a history of the session to the communication network control system, determining, in the communication network control system, whether or not to allow switching based on the switching request signal, performing, in the communication network control system, call connection to the communication terminal of the switching destination when the switching is allowed as a result of the determination, transmitting, in the communication network control system, a session establishment request signal including state information of the session executed by the communication terminal of a switching source to the communication terminal of the switching destination, and performing, in the communication network control system, path control and establishing new session connection between the communication terminal of the switching destination and the communicating-apparatus communication terminal, after the communication terminal of the switching destination setting a state of the session based on the state information of the session.

Thus, in the communication network, while setting, managing and controlling the data transmission path, the physical logical transmission path of end-end session connection i.e. between applications using the transmitted data is managed and controlled, the information including the session prior to switching, the state of the communication application and the history is transmitted to the switching-destination communication terminal, the switching-destination communication terminal is thereby capable of setting the session and state of the communication application corresponding to the received information, and the session is then transferred. It is thus possible to implement smooth and seamless switching between communication terminals including state management of the session and application. Further, it is made ease to work with other management and control functions provided on the communication network, and it is thereby possible to realize advanced sophisticated communication service with ease, and to enhance the expandability and flexibility. Furthermore, by beforehand notifying the switching-destination communication terminal of transfer of the session to confirm using short-distance communication means, the communication terminal prepares for receiving the transferred session, or the session is not transferred to the switching-destination communication terminal occupied by another processing, and it is thus possible to implement smooth reliable switching according to circumstances. Still furthermore, the communication network control system transmits, to the switching-destination communication terminal, a session establishment request signal including the information indicating transfer of session connection transferred from the communication terminal prior to switching, and establishes session connection with the application on the switching-destination communication terminal, and therefore, the switching-destination communication is capable of responding to call connection and session connection after identifying the session transferred from the communication terminal prior to switching.

(13) Further, a communication network control method according to the invention is a communication network control method for switching at least one communication terminal that performs communications to another communication terminal that does not perform the communications without suspending the communications, and thus controlling the communications to be continued, using a communication network control system provided with mobility management means for setting a physical and logical transmission path between communication terminals, and at least controlling a data packet transfer path and a call to the communication terminal, and service management means for managing a session that is a state where data communications are established between applications of the communication terminals on the transmission path, while controlling a start, suspension, resuming and releasing of session connection, and is characterized by including the steps of transmitting, in the at least one communication terminal that performs the communications, a switching request signal for a communication terminal of a switching destination that does not perform the communications including information on a session, a state of a communication application and a history of the session to the communication network control system, determining, in the communication network control system, whether or not to allow switching based on the switching request signal and notifying a determination result to the communication terminal of the switching source, performing, in the communication terminal of the switching destination, call connection to the communication network control system, while requesting session establishment, notifying, in the communication network control system, state information of the session executed between a communicating-apparatus communication terminal and the communication terminal of the switching source to the communication terminal of the switching destination, and establishing, in the communication network control system, new session connection between the communication terminal of the switching destination and the communicating-apparatus communication terminal, after the communication terminal of the switching destination setting a state of the session based on the state information of the session.

Thus, the communication terminal of the switching destination performs call connection to the communication network control system according to instructions from the communication terminal of the switching source, and it is thus possible to perform call connection using a call placed from the communication terminal side of the switching destination as a trigger. Further, it is possible to implement smooth and seamless switching between communication terminals including state management of the session and application.

(14) Further, the communication network control method according to the invention is characterized by further including a step of transmitting, in the communication terminal of the switching source that performs the communications, a switching preparation request signal to the communication terminal of the switching destination that does not perform the communications using short-distance communication means without through the communication network before transmission of the switching request signal, where the communication terminal transmitting the switching preparation request signal transmits the switching request signal after receiving a response signal from the communication terminal of the switching destination.

Thus, in the communication network, in addition to the function of setting and managing the data transmission path, exerted are the function of managing and controlling the physical logical transmission path of end-end session i.e. between applications using the transmitted data, and the function of notifying the session state prior to switching to the switching-destination communication terminal. It is thus possible to implement smooth and seamless switching between communication terminals including state management of the session and application. Further, it is made ease to work with other management and control functions provided on the communication network, and it is thereby possible to realize advanced sophisticated communication service with ease, and to enhance the expandability and flexibility. Furthermore, since the communication terminal of the switching destination requests call connection to the communication network, it is possible to implement smooth reliable switching to the switching-destination communication terminal already having prepared for reception of the session scheduled to be transferred.

(15) Further, a communication network control method according to the invention is a communication network control method for switching at least one communication terminal that performs communications to another communication terminal that does not perform the communications without suspending the communications, and thus controlling the communications to be continued, using a communication network control system provided with mobility management means for setting a physical and logical transmission path between communication terminals, and at least controlling a data packet transfer path and a call to the communication terminal, and service management means for managing a session that is a state where data communications are established between applications of the communication terminals on the transmission path, while controlling a start, suspension, resuming and releasing of session connection, and is characterized by including the steps of transmitting, in the at least one communication terminal that performs the communications, a switching request signal including an identification number of a communication terminal of a switching destination that does not perform the communications to the communication network control system, searching, in the communication network control system, attribute information of the communication terminal of the switching destination based on the identification information to determine whether or not to allow switching, performing, in the communication network control system, call connection on the communication terminal of the switching destination when the switching is allowed as a determination result, performing, in the communication network control system, a session establishment request including state information of the session executed by the communication terminal of a switching source and information indicative of a session transfer from the communication terminal of the communication source on the communication terminal of the switching destination, and establishing, in the communication network control system, new session between the communication terminal of the switching destination and the communicating-apparatus communication terminal, after the communication terminal of the switching destination setting a state of the session based on the state information of the session.

Thus, processing capabilities and usable applications of the communication terminal of the switching destination are analyzed based on the terminal information acquired in the control system, whether switching to the communication terminal of the switching destination is allowed or not is determined, and when the switching is allowed, an application is selected that is suitable for the communication terminal of the switching destination. It is thereby possible to implement switching between terminals, even without supplementary information such as the state information of the session provided from the communication terminal, terminal information indicating the terminal capabilities of the communication terminal of the switching destination and the like. Further, it is possible to implement switching between communication terminals irrespective of whether the communication terminal of the switching destination is the same type or a different type as/from that of the communication terminal of the switching source.

(16) Further, a communication network control method according to the invention is a communication network control method for switching at least one communication terminal that performs communications to another communication terminal that does not perform the communications without suspending the communications, and thus controlling the communications to be continued, using a communication network control system provided with mobility management means for setting a physical and logical transmission path between communication terminals, and at least controlling a data packet transfer path and a call to the communication terminal, and service management means for managing a session that is a state where data communications are established between applications of the communication terminals on the transmission path, while controlling a start, suspension, resuming and releasing of session connection, and is characterized by including the steps of determining, in the communication network control system, communication quality based on a load status of traffic of the communication network or wire less transmission resource status, searching for an identification number of another communication terminal switchable at this point, searching, in the communication network control system, attribute information of the communication terminal of the switching destination based on the identification number to determine whether or not to allow switching, notifying, in the communication network control system, the communication terminal of the switching source of information indicating that the session is transferred to another communication terminal when the switching is allowed as a determination result, performing call connection on the communication terminal of the switching destination, performing, in the communication network control system, a session establishment request including state information of the session executed by the communication terminal of a switching source and information indicative of a session transfer from the communication terminal of the communication source on the communication terminal of the switching destination, and establishing, in the communication network control system, new session connection between the communication terminal of the switching destination and the communicating-apparatus communication terminal, after the communication terminal of the switching destination setting a state of the session based on the state information of the session.

According to this configuration, it is possible on the communication network side to determine whether to perform communications with another communication terminal that does not perform the communications corresponding to the status of usable or available resources, without the communication terminal transmitting a switching request signal to the communication network. For example, when a first communication terminal is a communication terminal such as a cellular telephone or the like which is limited in data processing capability to some extent and affected greatly by circumstances of transmission resources such as radio propagation path conditions, and a second communication terminal is a communication terminal such as a personal computer or the like which is higher in data processing capabilities and capable of using broadband wire transmission resources, by determination on the communication network side, it is possible to set session connection with the second communication terminal to transfer the session. Further, it is possible to use resources to set session connection, after checking the traffic on the communication network and usage or vacant status of transmission resources and confirming available resources.

Advantageous Effect of the Invention

According to the invention, corresponding to a change in circumstance of the user, only by performing easy button operation or the like in requesting switching, the user is capable of implementing switching between communication terminals to use while reducing work of the operation and time loss greatly as compared with the conventional technique, and enjoying more advanced service. Further, without imposing loads on the terminal of the communicating apparatus and server apparatus, the service is continued. Furthermore, even when capabilities and attributes are different between communication terminals of the switching source and switching destination on the reception side, by the control of the service management means, the data format is optimized and transmitted corresponding to each communication terminal, and there is an advantage that the switching-destination communication terminal, server apparatus and communicating-apparatus communication terminal do not need to be aware of a change in data form. By thus providing commonality of service provision grounds, users are capable of enjoying seamless service without much concern for differences of the type of communication terminal and the like, as distinct from the conventional wire and wireless networks and service.

BEST MODE FOR CARRYING OUT THE INVENTION

An embodiment of the invention will be described below with reference to accompanying drawings. In a control system of a communication network according to this embodiment, as well as the functions of setting and managing the data transmission path, a control apparatus on the communication network exerts the function of managing and controlling session connection of end-end i.e. the logical transmission path between applications using the transmitted data, and the function of notifying the state information of session connection to the switching-destination communication terminal. By these functions, implemented is smooth and seamless switching between communication terminals including state management of the session and application.

Further, in communication terminals according to this embodiment, the communication terminal of the switching source exerts the function of notifying the communication network control system of the state information of session connection to compensate the session state information managed by the control system. Further, based on the session state information notified from the control system, the communication terminal of the switching destination exerts the function of setting a state of the session and resuming and executing transferred session connection. By these functions, smooth and seamless terminal switching is implemented while keeping the state of the session accurately.

Furthermore, in this embodiment, a mobility management function is used that switches between transmission paths appropriately while following a change in path information according to a shift of the position of the communication terminal provided on the mobile communication network, and is operated with the above-mentioned management and control function of the session state, setting of the transmission path is thus set in switching between communication terminals, and actualization can be made by minimum expansion from the conventional technique.

In next-generation mobile communication networks, it is expected constructing and using an all-IP-based platform of transmitting and exchanging all data in IP-packet form. The so-called call control separate architecture has been studied of clearly separating a data transmission function part (transport layer) dedicated to transmit efficiently IP packets at high speed, and control function part of moving management of communication terminals, call control corresponding to moving, path control and the like.

In other words, by adopting the configuration where the control function part instructs a path of IP packets, transmission resource allocation and the like to the data transmission function part, high speed and high efficiency is intended as the entire system. Further, in the all-IP-based platform, it is expected transmitting control signals of call control and the like and signaling also in IP-packet form.

Furthermore, in the all-IP-based platform, to make the network sophisticated and high value to provide various kinds of communication service flexibility with versatility, it has been studied providing the service management function of instructing from an upper layer. In contrast to the conventional service mainly including speech telephones where predominant operation of the network is the call control function of setting a physical logical transmission path of end-end, the next-generation all-IP-based platform means that the network is provided with the function of managing session connection that is logical connection between end-end communication applications, and the function of controlling the session connection.

Herein, a call or call connection indicates a physical logical path (is set) to transmit data to a communicating-apparatus between end-end terminals, and session connection indicates a state where a communication application of a communication terminal can receive and process (processes) data from an application on a terminal of the communicating-apparatus. In other words, a state where data can be transmitted and received to/from the communicating apparatus but an application to be used is not determined is a state where call connection is made but session connection is not made. Inversely, a state where an application is prepared for data transmission and reception but a data transmission path is lost (for example, a cellular telephone moves out of the zone) is a state where session connection is made but call connection is not made. In the next-generation all-IP-based platform, it has been studied that by providing the service management function (including the session management function and session control function), even when the communication terminal becomes a state where call connection to the network is disconnected, by the session management function of managing the session state continued up to the last moment, session connection can be resumed by the session control function based on the session state managed by the session management function when call connection is connected again to thereby assure that communications are maintained.

In the conventional speech telephone, this call connection and session connection is not distinguished particularly, but in the multi-media communication and data communication, session connection is established between applications of communication terminals on the transmission path established in end-end after setting call connection. In other words, after the communication terminal performs call connection and is made capable of transmitting control information to the communication network, the application on the communication terminal requests the service management function on the communication network, the service management function transmits a session connection setting request to an application on the communicating-apparatus communication terminal, and the application is executed.

This is because the need arises of supporting on the network side connection control corresponding to various communication aspects, mode, media and the like with diversification and sophistication of communications. For example, in the case of distinguishing between a call of only speech and video telephone, designating quality and terminal capabilities such as resolution and bit rate in video telephone to make call connection and session connection to a communicating apparatus or the like, it is necessary to support, by capabilities on the network side, the functions insufficient only by negotiation of end-end such as address solution to designate a terminal meeting these requirements, setting (call control, path control) of the transmission path with appropriate quality and the like. Therefore, the session control function is provided, and configured to control the communication state, mode and the like of session i.e. between end-end applications, while instructing the call control function and path control function to set a transmission path enabling transmission with a suitable band and quality. At this point, a connection request (session establishment request) from the application of the communication terminal is transmitted to the session control function and processed.

Further, on the mobile communication network, transmission path control is ordinarily performed of a router for transmitting IP packets while maintaining the above-mentioned call connection and session connection, with a shift of the position of the communication terminal and a change in base station to hold. In handover control in the next-generation mobile communication network, it has been studied updating path information to a position corresponding to the position and transmitting IP packets appropriately to the moving destination position of the communication terminal. By this path control, although the path of the communication terminal changes, the session management function manages the session state of end-end. Then, when an unintentional change (disconnection by shortage of resources and the like) occurs in the session state, the session control function controls to change the mode of the session, or controls the call control function and path control function, thereby guaranteeing preservation of the session and communication quality, and it is thus possible to perform communications without disconnection.

In the communication network control system according to this embodiment, each control/management section as described above is configured as shown in FIG. 1. In other words, a communication network control system 100 is provided with a transport layer 110 for transmitting IP packets, a mobility management section 120 for managing the transport layer 110, and performing management of a physical position of a communication terminal, setting of call connection to the position and path control, and further, a service management section 130 for having functions of taking charge of supporting user advanced requirements such as instructing the mobility management section 120, performing management and control of session connection to provide service, and switching between communication terminals while maintaining the service and the like. The service management section 130 exerts the session management function, session control function, and further, terminal capability management function, terminal capability analysis function, state analysis function, determination function.

Further, in FIG. 1, a server apparatus X has at least an application to execute the service and distribution suspension/resuming function. A base station 150 exerts a position registration receiving function, call control function, and path information management function. Further, a communication terminal 160 is provided with at least a user interface comprised of an image display device, speech input/output device, character input device and the like, and an application to execute the service, exerts the call control function and position registration function required to connect to the communication network, and further, the session management function, session control function, switching request function, terminal capability management function, state setting function, and has a short-distance communication function using wireless communication such as IR, Bluetooth (registered trademark), or UWB having a potential of being put in practical use in the near future or the like, wire communication such as USB, and the like.

Described next are session switching procedures in this embodiment. The seamless session switching procedures in this embodiment are as follows, as shown in FIG. 2, when a communication terminal #1 is performing session connection A with a communicating-apparatus communication terminal:
(1) A procedure of transmitting a switching request signal to the communication network control system from the communication terminal #1 in communication;
(2) a procedure of establishing call connection between a switching-destination communication terminal #2 and the communicating-apparatus communication terminal by a call from the control system side or the switching-destination communication terminal #2 that does not perform the communications;
(3) a procedure of transmitting a session establishment request signal from the calling side;
(4) a procedure of notifying the switching-destination communication terminal #2 of state information of the session connection A prior to switching, and setting the state prior to switching in switching-destination communication terminal #2; and
(5) a procedure of resuming session connection B continued from the session connection A between the communicating-apparatus communication terminal and switching-destination communication terminal #2.

According to this embodiment, it is possible to perform terminal switching by judgment of the service management section 130 of the communication network control system, instead of a request from the communication terminal #1 (user) in communication. In this case, the procedure of above-mentioned (1) is omitted, and procedures are executed from above-mentioned (2). Alternately, in the procedure of above-mentioned (1), communication network control system transmits a switching notification signal to the communication terminal #1.

In this embodiment, both the switching-source communication terminal #1 side and the communication network control system side or at least the former side needs to manage states of the session and application, notify the switching-destination communication terminal of the session state information, and transfer the session state to the switching-destination communication terminal. Accordingly, means for transmitting and notifying the session state information is required, and the switching-source communication terminal #1 may include the session state information managed by the session management function of the terminal #1 to transmit when the switching-source communication terminal #1 transmits a switching request signal to the communication network control system in the procedure of above-mentioned (1), the session establishment request may include the session state information in the procedure of above-mentioned (3) to be notified to the switching-destination communication terminal #2 from the control system side, or the session state information managed by the control system side may be included in the procedure of above-mentioned (3) to be notified to the communication terminal #2.

Further, the session state information is not included in the procedure of above-mentioned (3) to instruct the communication terminal #1 to directly notify to the communication terminal #2, and the communication terminal #1 may notify the communication terminal #2 of the session state information managed by the communication terminal #1 using the short-distance communication means using wireless communication such as IR, Bluetooth (registered trademark), or UWB having a potential of being put in practical use in the near future or the like, or wire communication such as USB. The service management section 130 on the control system side or the communication terminal #1 notifies the switching-destination communication terminal #2 of the session state information using any one of the schemes. Whether using anyone of the schemes or using both the schemes is beforehand selected and installed corresponding to the configuration of the control system, conditions and constrains of installation, transmission resources, processing capabilities of the communication terminal, information amount and complexity to transmit as the session state information, and descriptions and attribution of the session state information, or the service management section 130 or the communication terminal #1 selects an appropriate scheme whenever performing switching between terminals, and transfer of the session.

Furthermore, as establishment of call connection in the procedure of (2), there are two methods i.e. a case of placing a call from the control system side of the communication network side to the switching-destination communication terminal #2 to establish call connection as shown in FIG. 2 and a method of placing a call from the switching-destination communication terminal #2 to establish call connection. In the former case, the switching-destination communication terminal #2 waits for control from the control system side passively, but by including information indicating a call and session transfer from the switching-source communication terminal #1 to notify the communication terminal #2, in performing call connection from the control system side in the procedure of (2), or in transmitting a session establishment request in the procedure of (3), the switching-destination communication terminal #2 is capable of recognizing the transfer, and receiving the transfer smoothly.

In the latter case, a call can be placed by intention of (the user of) the switching-destination communication terminal #2, and to cause the calling timing to be subsequent to the procedure of (1), a call instruction from the communication terminal #1 to the communication terminal #2 may be adjusted by the short-distance communication means or the like.

Further, as shown by (01) and (02) in FIG. 2, by using the short-distance communication means, a switching preparation request is transmitted from the switching-source communication terminal #1 to switching-destination communication terminal #2, or the switching-destination communication terminal #2 notifies the switching-source communication terminal #1 of the address information (such a telephone number and URL) of the terminal #2 and terminal information according to the processing capabilities of the terminal, such as transmission means available at this point, transmission capacity and the like, the information is thus contained in the switching request of the procedure of (1) and notified to the control system, and thus, the communication terminals may negotiate with each other to compensate the information to further facilitate switching control on the control system side.

In addition, the communication terminal #1 may perform "switching check" based on the information received from the communication network control system after performing the procedure of (1) on the communication network control system.

Thus, the session switching procedures in this embodiment are easy to expand to various patterns corresponding to combinations of the above-mentioned procedures and the direction of control instruction. Example 1 will be described below.

EXAMPLE 1

FIG. 3 is a diagram illustrating Example 1 of session switching by each control/management section and communication terminals in the communication network control system according to this embodiment. Shown herein is the case of switching to another communication terminal #2 during reception of content distribution service in the communication terminal #1, based on the premise that call connection and session connection (shown by session connection A for convenience) is already established between the server apparatus X of the content data distribution source and the communication terminal #1 on the reception side via the communication network, content data such as, for example, speech, moving pictures or the like is being distributed, and that the application is being executed.

In the case of switching the session from the communication terminal #1 to the communication terminal #2 that does not perform communications, a user first requests the switching-destination communication terminal #2 to prepare the switching using the short-distance communication means as in C401 by button operation and the like of the communication terminal #1. The communication terminal #2 responds as in C402 to the communication terminal #1 also using the short-distance communication means, including the terminal information of the terminal #2 managed by the terminal capability management function.

The communication terminal #1 transmits to the service management section of the control system as in C403 the control information of the switching request including the state information of the session connection A including the information such as the kind and type of the content data being received at the time, kind and version of the browser, data reception elapsed time, bit rate in reception, display resolution in replay and the like, and the terminal information acquired from the communication terminal #2 in the procedure as described above (the above-mentioned procedure of (1)).

Herein, the above-mentioned procedures C401 and C402 mean negotiations between communication terminals to prepare for terminal switching control by the communication network control system. In addition, the negotiations between communication terminals may be performed or not performed in the procedures C401 and C402, but when the negotiations are not performed, the terminal information of the communication terminal #2 may not be acquired automatically. By the operation of user inputting the terminal specific address information such as a telephone number and URL of the communication terminal #2 from the communication terminal #1, reading the address information of the communication terminal #2 beforehand stored in the communication terminal #1, or the like, the communication terminal #2 is designated, and the control information of the switching request including the address information is transmitted to the service management section.

When the switching request C403 includes the terminal information of the communication terminal #2, the service management section analyzes the processing capabilities of the communication terminal #2 by the terminal capability analysis function. When the terminal information is not acquired and the address information of the communication terminal #2 is only designated, the service management section specifies the kind, type and the like of the communication terminal #2 by the terminal capability management function from the address information, and analyzes the processing capabilities of the communication terminal #2 by the terminal capability analysis function. Further, the service management section analyzes the session state information of the communication terminal #1 contained in the switching request C403 by the session state analysis function. As results of the analyses, the service management section determines whether or not to allow switching of the session, and requests the mobility management section to set call connection between the terminal #2 and apparatus X including (address information of) the communication terminal #2 and (address information of) the server apparatus X that is the communicating apparatus as in C404.

The mobility management section instructs a base station 2 in an area where the communication terminal #2 exists to place a call by the position management function and call control function as in C405. The base station 2 places a call to the communication terminal #2 by the call control function as in C406. The communication terminal #2 responds to the call as in C407. Then, the base station 2 responds to the mobility management section as in C408. The mobility management section instructs and controls the path information management functions of the base stations 1 and 2 to set a path between the communication terminal #2 and the server apparatus X, and when the path is set, notifies the service management section that is the call connection request source of completion of setting of call connection as in C409 (the procedure of (2)).

The service management section requests the server apparatus X to temporarily hold distribution of the content data as in C410. When the server apparatus X holds the data distribution, the session connection A is suspended that is executed with the communication terminal #1, and when the service management section receives a response C411 from the server apparatus X, the service management section grasps the state information of the session connection A by the session management function. The procedure of grasping the session state information from the session management function is compensated by the session state information acquired from the communication terminal #1 in the procedure of C403. In addition, the session state information may be notified from the communication terminal #1 to the service management section, or managed by the session management function in the service management section. The service management section transmits a session establishment request signal as in C412 to the communication terminal #2, including the session state information (the procedure of (3)). At this point, the control information of C412 may include the information indicating session transfer from the communication terminal #1.

Upon receiving the session state information contained in the session establishment request signal, the communication terminal #2 performs startup of a required application and the like by the state setting function, and responds to the service management section as in C413 (the procedure of (4)).

The service management section requests the server apparatus X holding the distribution to resume the distribution as in C414, and the server apparatus X resumes the data distribution (the procedure of (5)). The resuming request may include information indicating that the communicating apparatus is switched to the communication terminal #2. Data (IP packets) distributed from the server apparatus X is transferred to each router of the transport layer in the base station 1 according to the path information set in the above-mentioned procedure. Subsequent data is thus transmitted to the communication terminal #2, and the session connection B is established. The shift from the session connection A to the session connection B is completed by the procedures as described above.

In aforementioned Example 1, a call is placed to the switching-destination communication terminal #2 from the communication network control system side. According to this embodiment, it is also possible to place a call on the communication terminal #2 side of the switching destination. Procedures of this case will be described below as Example 2.

EXAMPLE 2

As in Example 1 as described above, FIG. 4 is based on the premise that call connection and session connection A is already established between the server apparatus X of the content data distribution source and the communication terminal #1 on the reception side via the communication network, and that content data is being distributed. In the case of switching the session from the communication terminal #1 to the communication terminal #2 that does not perform communications, a user requests the communication terminal #2 to prepare the switching using short-distance communication as in C501 by button operation and the like of the communication terminal #1.

When the request of preparing the switching is allowed, the communication terminal #2 responds as in C502 to the communication terminal #1 by short-distance communication, including the terminal information of the terminal #2 managed by the terminal capability management function. Herein, as in Example 1, the above-mentioned procedures C501 and C502 mean the negotiations to prepare for terminal switching control by the communication network control system, and when the negotiations are omitted, session connection is switched from procedures as described below.

The communication terminal #1 transmits to the service management section of the communication network control system as in C503 the switching request including the state information of the session connection A being executed at this point and the terminal information acquired from the communication terminal #2 in the procedure of C502. In addition, when the negotiations of C501 and C502 are omitted, the terminal information of the communication terminal #2 may not be acquired automatically. In this case, the user may designate the address information of the communication terminal #2 by the operation of communication terminal #1, and include in the control information of the switching request of C503 to transmit to the service management section (the above-mentioned procedure of (1)).

When the switching request includes the terminal information of the communication terminal #2, the service management section analyzes the processing capabilities of the communication terminal #2 by the terminal capability analysis function. When the terminal information is not acquired and the address information of the communication terminal #2 is only designated, the service management section specifies the kind, type and the like of the communication terminal #2 by the terminal capability management function, and analyzes the processing capabilities of the communication terminal #2 by the terminal capability analysis function. Further, the service management section analyzes the session state information of the communication terminal #1 contained in the switching request C503 by the session state analysis function, determines whether or not to allow switching, and makes an Ack-response to the communication terminal #1 as in C504. The communication terminal #1 requests call connection to the communication terminal #2 as in C505, including the address information of the server apparatus X that is the communicating apparatus, using short-distance communication. The procedure of C505 is to adjust the timing so that a call C506 from the communication terminal #2 described later is placed after C504 where the service management section checks whether or not the switching is allowed, and can be omitted when the same effect is obtained by configuring that the communication terminal #2 places a call after a lapse of sufficient time since the response of C502.

The communication terminal #2 places a call to a base station 2 in an area where the communication terminal #2 exists as in C506, while designating the address information of the server apparatus X, and the base station 2 requests the mobility management section to set call connection as in C507. The call may include information indicating switching from the communication terminal #1. The mobility management section instructs and controls the path information management functions of the base stations 1 and 2 to set a transmission path between the communication terminal #2 and the server apparatus X using the path control function, and when the path is set, responds to the base station 2 as in C508. The base station 2 responds to the communication terminal #2 that is the call connection request source as in C509 to notify of completion of setting of call connection. The communication terminal #2 transmits a session establishment request signal as in C510 to the service management section by the session control function (the procedure of (3)).

The service management section requests the server apparatus X to temporarily hold distribution of the content data to the communication terminal #1 as in C511, and when receiving data distribution temporary suspension response C512 from the server apparatus X, grasps the state of the session connection A between the server apparatus X and the communication terminal #1 by the session management function. The procedure of grasping the session state from the session management function is compensated by the session state information acquired from the communication terminal #1 in the procedure of C503.

In addition, as reception and transmission of the session state information, the session state information may be notified from the communication terminal #1 to the service management section, or managed by the session management function on the communication network. The service management section notifies the communication terminal #2 of the session state information as in C513 (the procedure of (4)). At this point, notification of the session state information of C513 may include the information indicating transfer of the session connection A from the communication terminal #1.

The communication terminal #2 performs startup of a required application and the like by the state setting function from the session state information, and responds to the service management section as in C514. Further, as a procedure different from this procedure, substituting for the procedures of C513 and C514, the procedure may include only the response from the service management section to the session establishment request C510 from the communication terminal #2. In this case, the session state information is included in the control information of the response and transmitted to the communication terminal #2 (the procedure of (4)).

The service management section requests the server apparatus X holding the distribution to resume the distribution as in C515, and the server apparatus X resumes the data distribution (the procedure of (5)). The resuming request may include information indicating that the communicating apparatus is switched to the communication terminal #2. When the server apparatus X resumes the distribution, data (IP packets) is transferred to each router of the transport layer in the base station 1 according to the path information. Subsequent data is thus transmitted to the communication terminal #2, and the session connection B is established. The shift from the session connection A to the session connection B i.e. switching between communication terminals is completed by the procedures as described above.

In Example 2, as compared with the case of Example 1, in order for the communication terminal #2 to place a call, it is necessary to instruct on the communication terminal #1 side the communication terminal #2 to place a call, and further, notify at this point also the address information of the server apparatus X that is the communicating apparatus as a call destination. Therefore, the address information is included in the procedure C501 of pre-negotiation and notified, or notified in repeated short-distance communication C505. Meanwhile, when the service management section makes notification C513 of the session state information to the communication terminal #2, since a call is placed on the communication terminal #2 side, the information indicating transfer of the session connection A from the communication terminal #1 may be included or not included.

Further, according to this embodiment, also when the communication terminal does not use or does not have the short-distance communication means i.e. in the case of omitting the procedures of negotiations between communication terminals as described in Examples 1 and 2, it is basically possible to execute terminal switching only using the functions of the control system on the communication network side. An example of this case will be described in following Example 3.

EXAMPLE 3

FIG. 5 is a diagram illustrating Example 3 of session switching by each control/management section and control of communication terminals in the communication network control system according to this embodiment, and also as in Examples 1 and 2, is based on the premise that call connection and session connection A is already established between the server apparatus X of the content data distribution source and the communication terminal #1 on the reception side via the communication network.

First, by button operation and the like of the communication terminal #1, a user inputs the terminal specific address information such as a telephone number and URL of the communication terminal #2 that is a switching destination, or reads the address information beforehand stored in the communication terminal #1, and transmits a switching request including the address information to the service management section of the communication network as in C601. The switching request may or may not include the session state information as in Examples 1 and 2 described previously. The example of not including is described herein.

Next, from the address information of the communication terminal #2 included in C601 as described above, the service management section specifies the processing capabilities of the communication terminal #2 by the terminal capability management function, determines whether or not to allow switching by the terminal capability analysis function, and requests the mobility management section to set call connection with the communication terminal #2 as in C602. The mobility management section instructs a base station 2 in an area where the communication terminal #2 exists to place a call by the position management function and call control function as in 603.

When the base station 2 places a call to the communication terminal #2 as in C604, and the communication terminal #2 responds to the call as in C605, the base station 2 responds to the mobility management section as in C606. Herein, in this Example 3, since pre-negotiations are not performed between communication terminals by short-distance communication, the call is desired to include information indicating transfer from the communication terminal #1. The communication terminal #2 is thereby capable of recognizing transfer from the communication terminal #1 and responding to the call smoothly. The mobility management section instructs and controls the path information management functions of the base stations 1 and 2 to set a path between the communication terminal #2 and the server apparatus X, and when the path is set, notifies the service management section that is the call connection request source of completion of setting of call connection as in C607 (the procedure of (2)).

The service management section requests the server apparatus X to temporarily hold distribution of the content data as in C608, and when receiving data distribution temporary suspension response C609 from the server apparatus X, grasps the state information of the session connection A between the server apparatus X and the communication terminal #1 by the session management function. This procedure is required when the communication terminal #1 does not include the session state information in the control information in C601 in transmitting a switching request to the service management section.

The service management section transmits a session establishment request to the communication terminal #2, including the session state information, as in C610 (the procedure of (3)). At this point, the request may include the information indicating transfer of session connection A executed by the communication terminal #1. Upon receiving the session state information, the communication terminal #2 performs startup of a required application and the like, and responds to the service management section as in C611 (the procedure of (4)).

The service management section requests the server apparatus X holding the distribution to resume the distribution as in C612, and the server apparatus X resumes the data distribution (the procedure of (5)). The resuming request may include information indicating that the communicating apparatus is switched to the communication terminal #2. When the server apparatus X resumes the distribution, data (IP packets) is transferred to each router of the transport layer in the base station 1 according to the path information. Subsequent data is thus transmitted to the communication terminal #2, and the session connection B continued from the session connection A is established. The session switching is completed by the procedures as described above.

This Example 3 shows the example where terminal switching is executed by the control system on the communication network side without negotiations performed between communication terminals using the short-distance communication means or the like. In other words, in the case where the communication terminal does not have the short-distance communication means, or the positions between the communication terminals are positioned in a distance not allowing the use of the short-distance communication means, the terminal switching can be executed, and this means that this embodiment is effective also in the case of transferring the session to a communication terminal at a location some distance.

In addition, each of the above-mentioned Examples describes the case where a user makes a switching request to the communication network from the communication terminal #1 that is a switching source, and thereby, each control function is started to perform terminal switching. According to this Embodiment, it is also possible that the control system side of the communication network first starts and switches between terminals, instead of (the user of) the communication terminal side. More specifically, in the case where the communication terminal #1 is a terminal limited in data processing capability and transmission resources to some extent, and the communication terminal #2 is a terminal higher in data processing capability with allowance in transmission resources, or the like, for example, such a case arises that the communication network control system detects that the user performing communications using the communication terminal #1 moves to near the communication terminal #2, the communication terminal #2 is connected to the network and becomes usable or the like, is triggered by such detection or the like, starts switching to the communication terminal #2 and transfers the session to the communication terminal #2 from the communication terminal #1. In this case, the side for starting a switching request serves as the service management section. This Example 4 will be described below.

EXAMPLE 4

As in Examples 1, 2 and 3 described previously, procedures are described on the premise that call connection and session connection is already established between the server apparatus X of the content data distribution source and the communication terminal #1 on the reception side via the communication network. The service management section determines switching to the communication terminal #2 by the determination function, transmits a switching request including information indicative of switching to the communication terminal #2 to the communication terminal #1, and thereby starts communication terminal switching procedures. Upon receiving a response to the switching request from the communication terminal #1, the service management section grasps the address information of the communication terminal #2 by the terminal capability management function, and requests the mobility management section to set call connection while designating the address information.

Herein, the response from the communication terminal #1 may include the state information of the session connection A. In this case, by including information to request notification of the session state information in requesting the switching to the communication terminal #1 from the service management section, it is possible to encourage the communication terminal #1 to transmit the state information of the session connection A.

The mobility management section instructs a base station 2 in an area where the communication terminal #2 exists to place a call by the position management function and call control function. When the base station 2 places a call to the communication terminal #2 and the communication terminal #2 responds to the call, the base station 2 responds to the mobility management section, and the mobility management section instructs and controls (base station on the transport layer and the like) to set a transmission path between the server apparatus X and the communication terminal #2, and notifies the service management section of completion of setting of call connection (the procedure of (2)).

The service management section requests the server apparatus X to temporarily hold distribution of the content, and when receiving a data distribution temporary suspension response from the server apparatus X, grasps the state information of the session connection between the server apparatus X and the communication terminal #1 by the session management function. In addition, when the communication terminal #1 includes the session state information in transmitting a switching request to the service management section in the aforementioned procedure, the service management section also grasps the session state information. The service management section transmits a session establishment request to the communication terminal #2, including the session state information (the procedure of (3)). At this point, such information may be included that indicates transfer of session connection A executed in the communication terminal #1. Upon receiving the session state information included in the session establishment request, the communication terminal #2 performs startup of a required application and the like, and responds to the service management section (the procedure of (4)).

The service management section requests the server apparatus X holding the distribution to resume the distribution, and the server apparatus X resumes the distribution (the procedure of (5)). The resuming request may include information indicating that the communicating apparatus is switched to the communication terminal #2. When the server apparatus X resumes the distribution, IP packets are transferred to each router of the transport layer in the base station 1 according to the set path information. Subsequent data is thus transmitted to the communication terminal #2, and the session connection B continued from the session connection A is established. The session switching is completed by the procedures as described above.

According to Example 4, it is possible to start on the control system side of the communication network to switch between communication terminals.

BRIEF DESCRIPTION OF SYMBOLS

Figure 1:
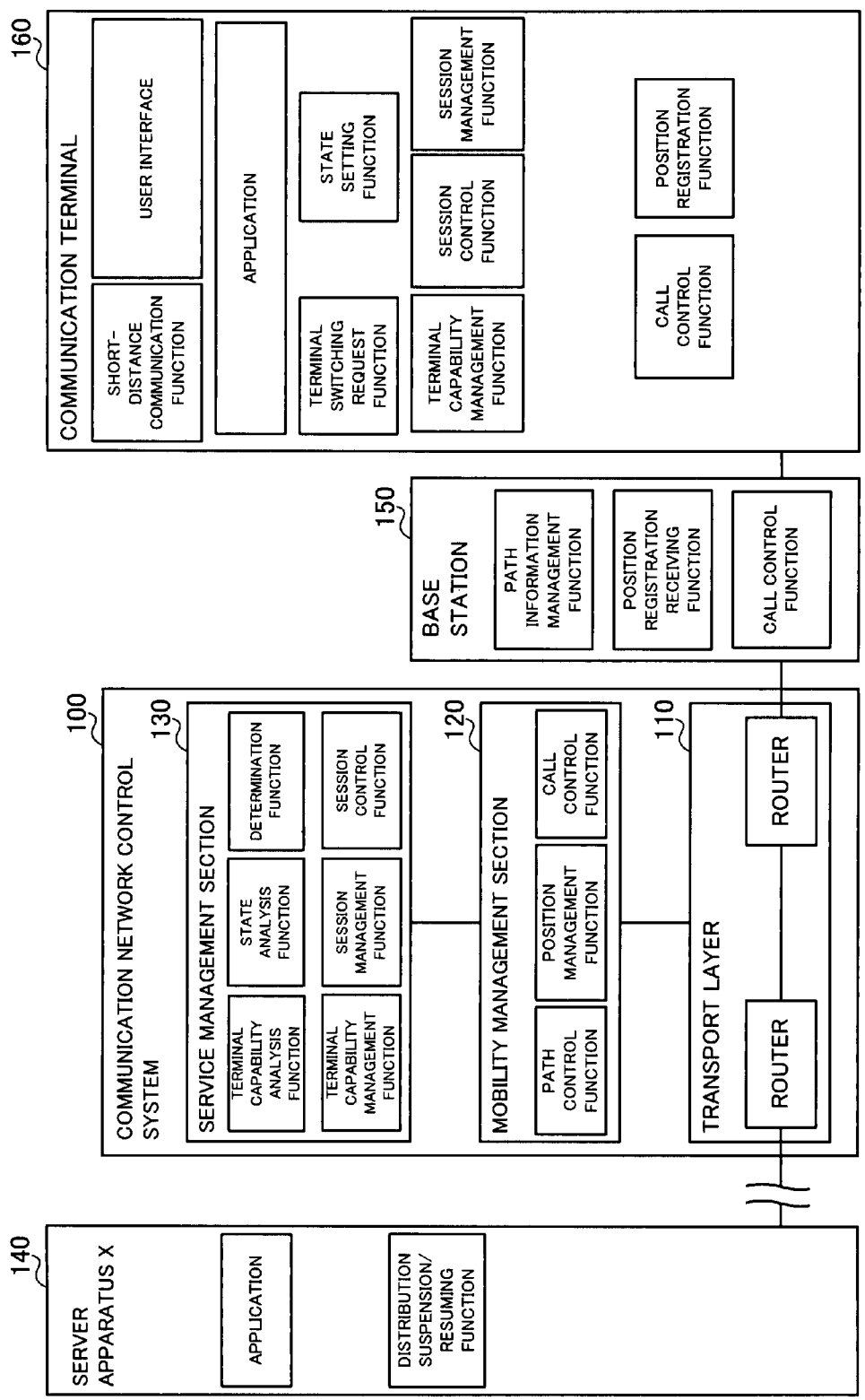
FIG. 1 is a diagram illustrating a schematic configuration of a control system of a communication network according to this embodiment.
Figure 2:
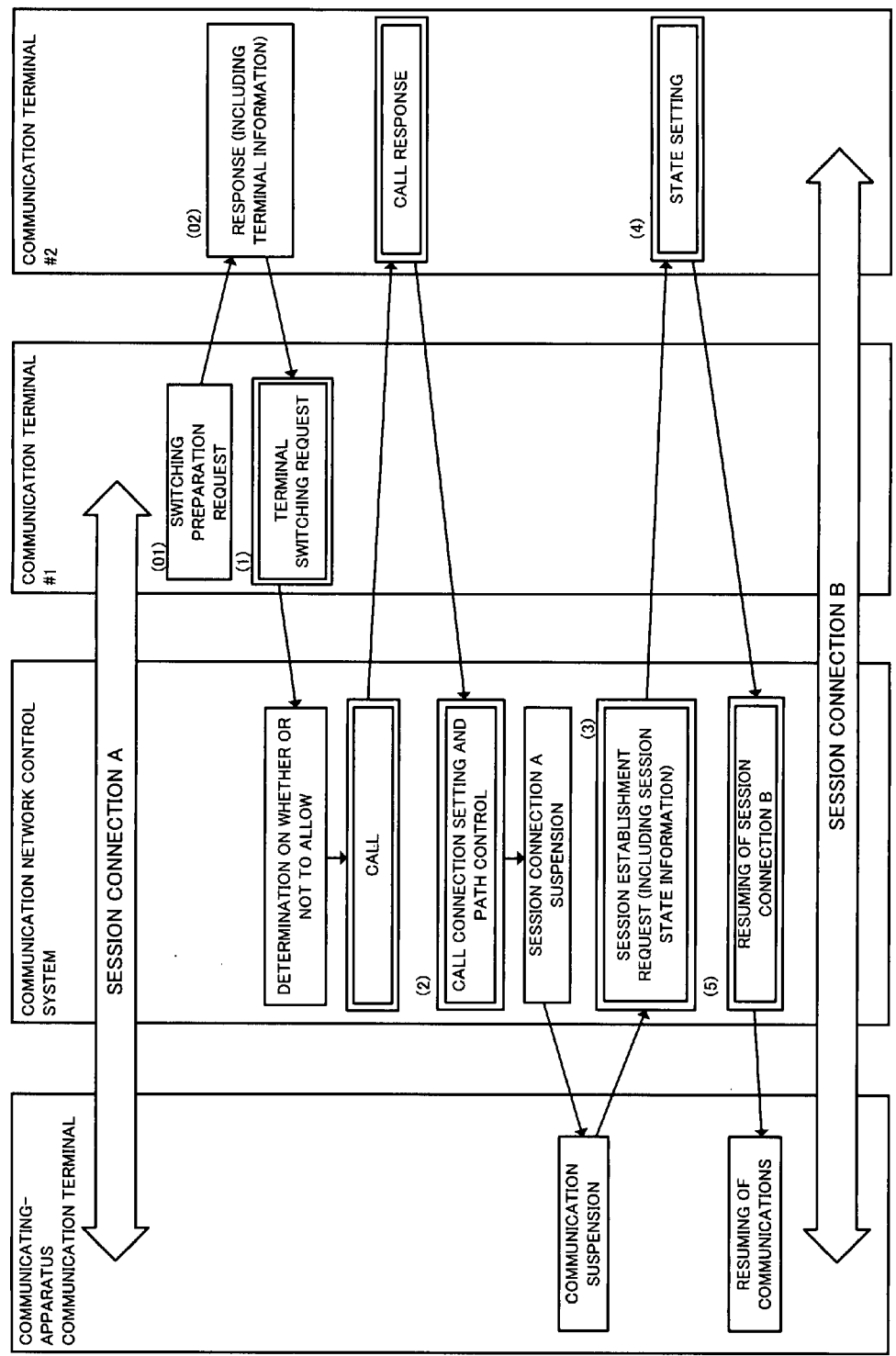
FIG. 2 is a diagram illustrating schematic implementation procedures of the control system of the communication network according to this embodiment.
Figure 3:
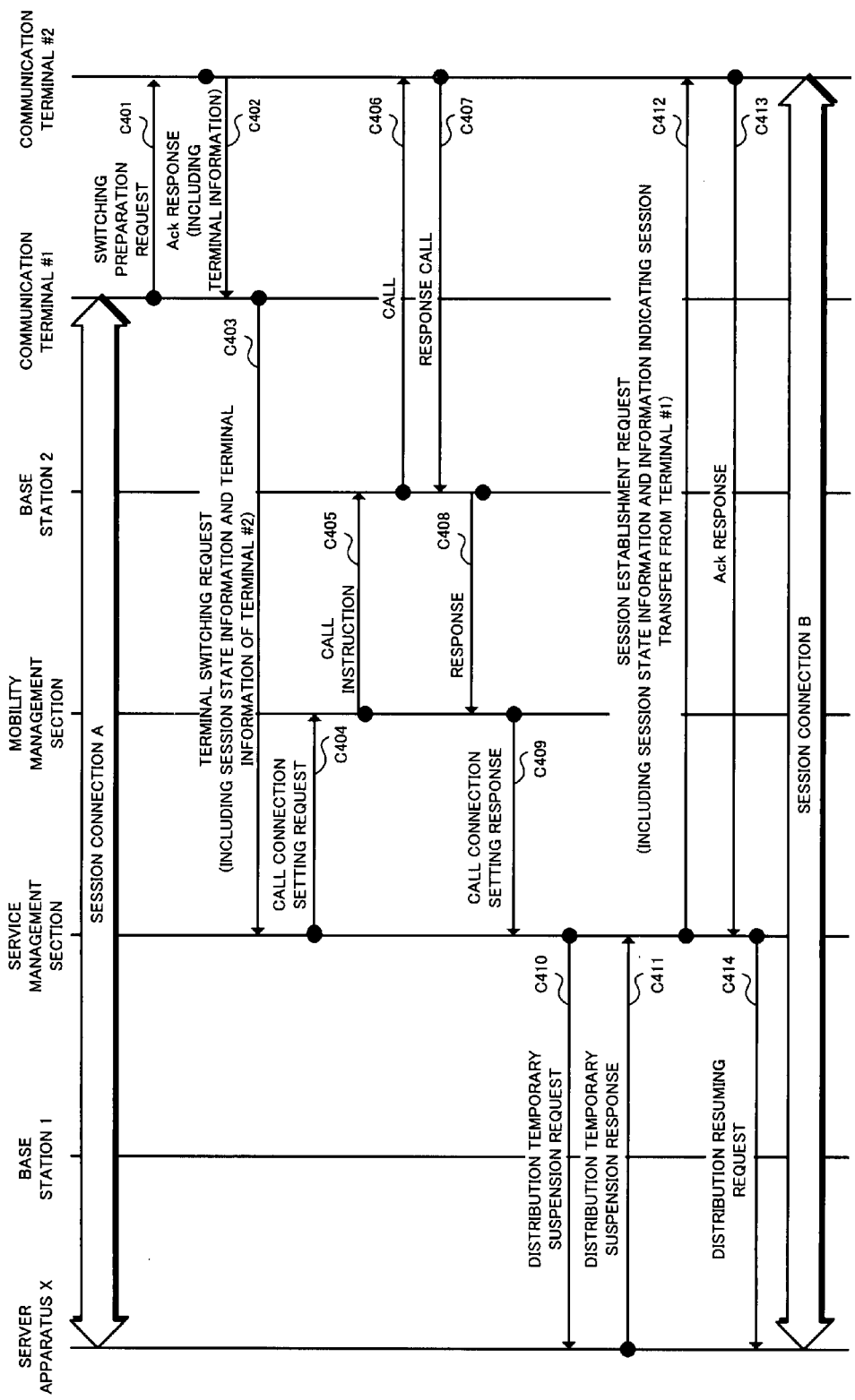
FIG. 3 is a diagram illustrating Example 1 of terminal switching by control of each control layer in the control system of the communication network according to this embodiment.
Figure 4:
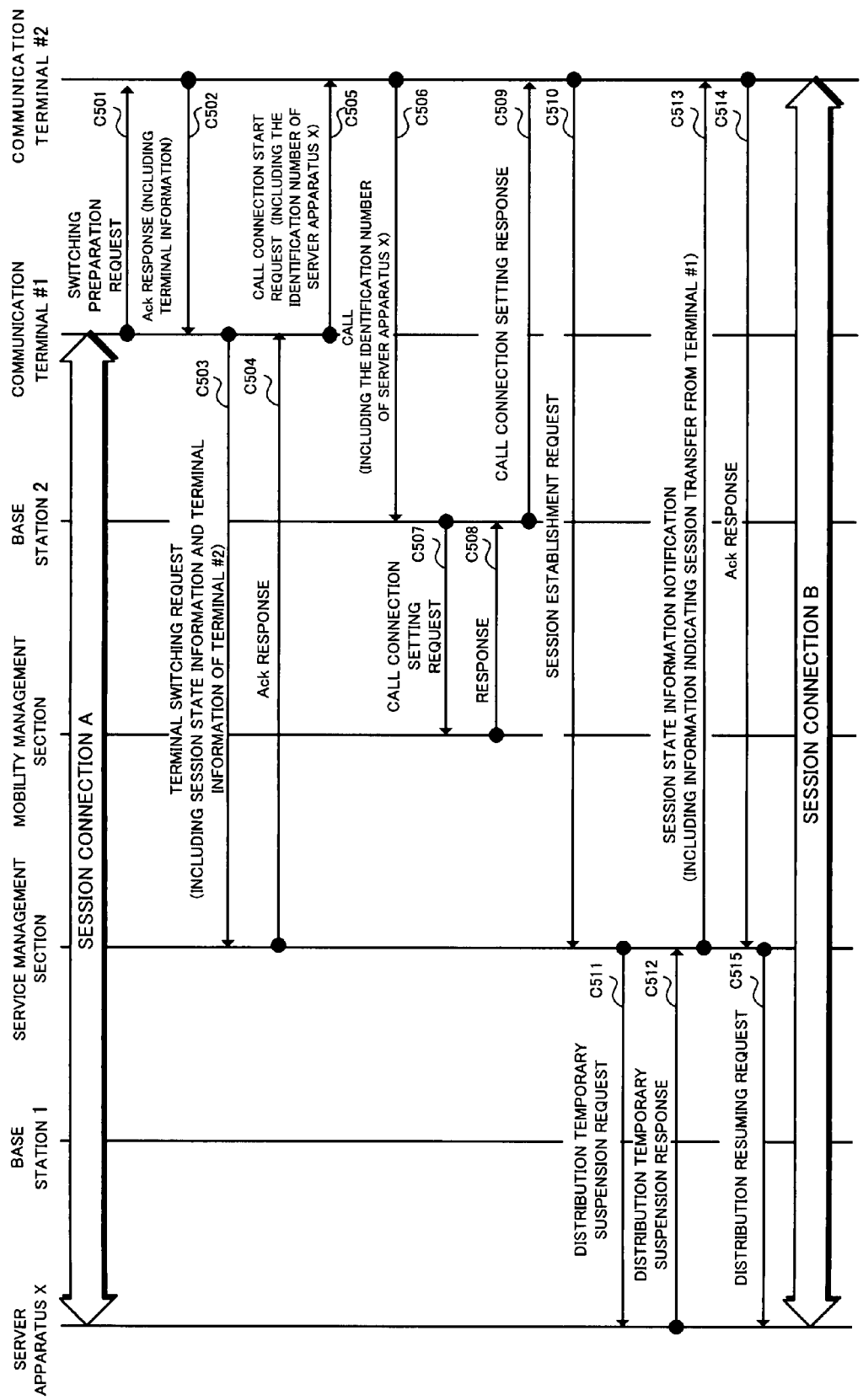
FIG. 4 is a diagram illustrating Example 2 of terminal switching by control of each control layer in the control system of the communication network according to this embodiment.
Figure 5:
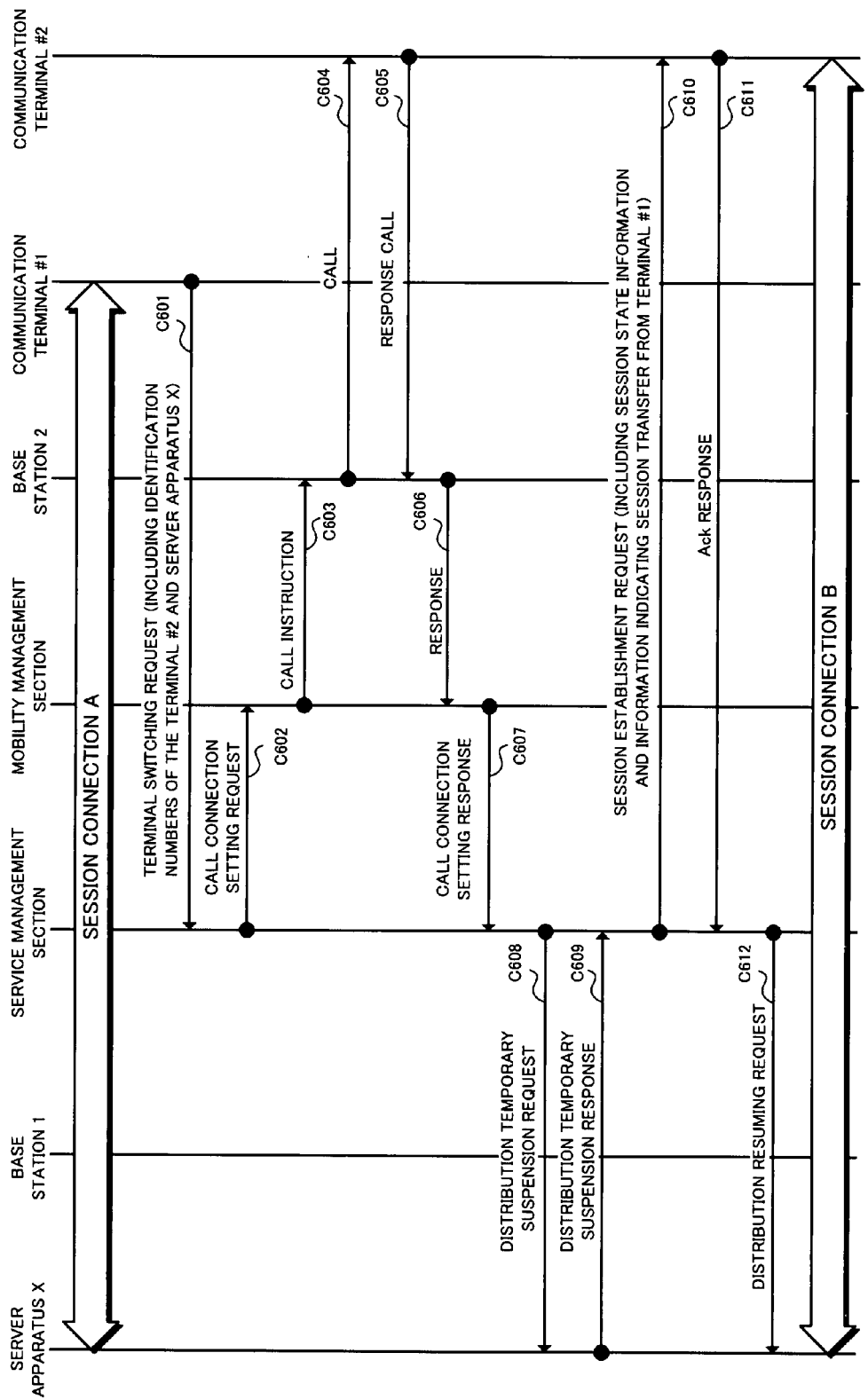
FIG. 5 is a diagram illustrating Example 3 of terminal switching by control of each control layer in the control system of the communication network according to a modification of this embodiment.
Figure 6:
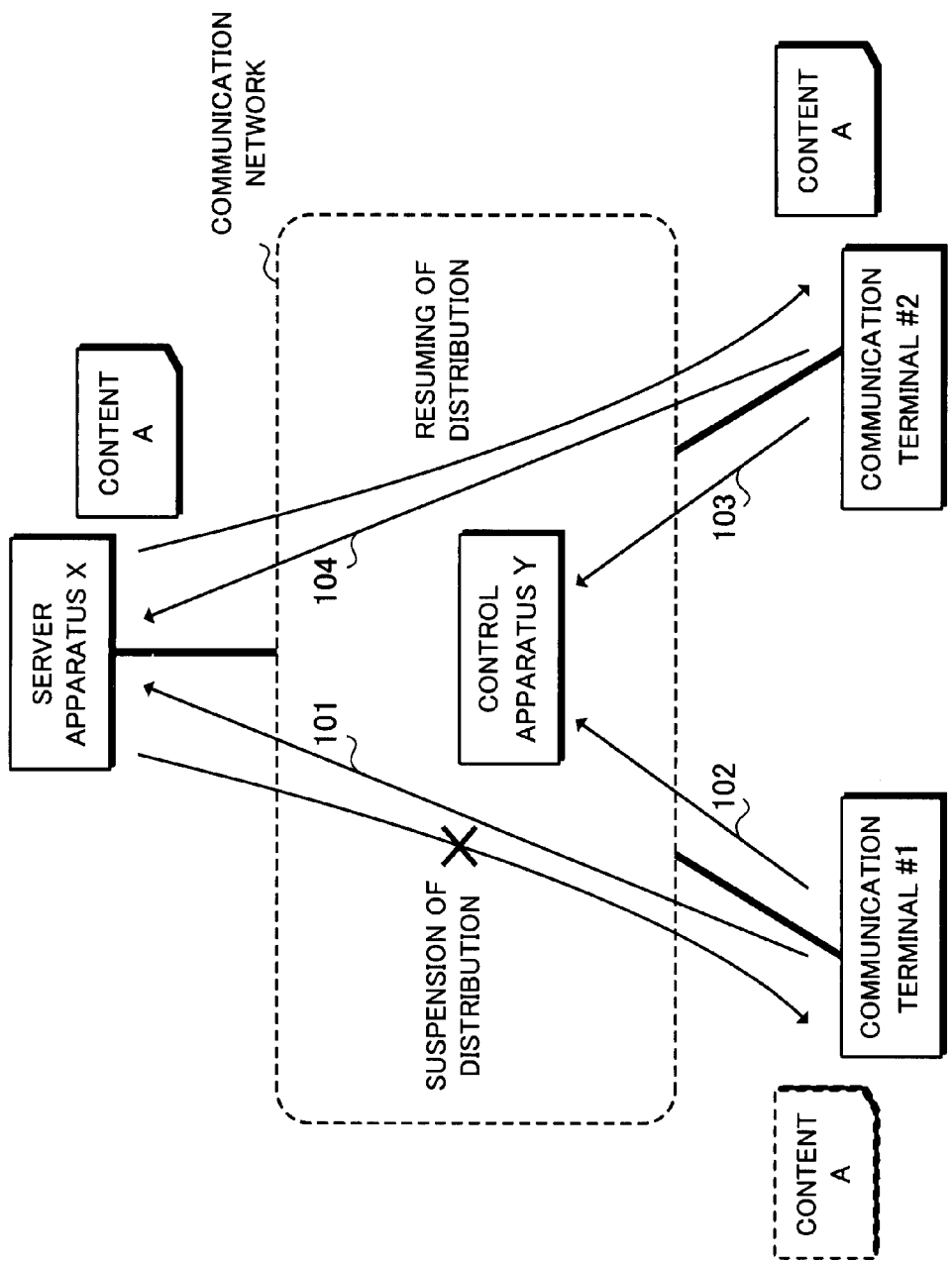
FIG. 6 is a diagram illustrating a first example of terminal switching in a control system of a communication network in the conventional technique.
Figure 7:
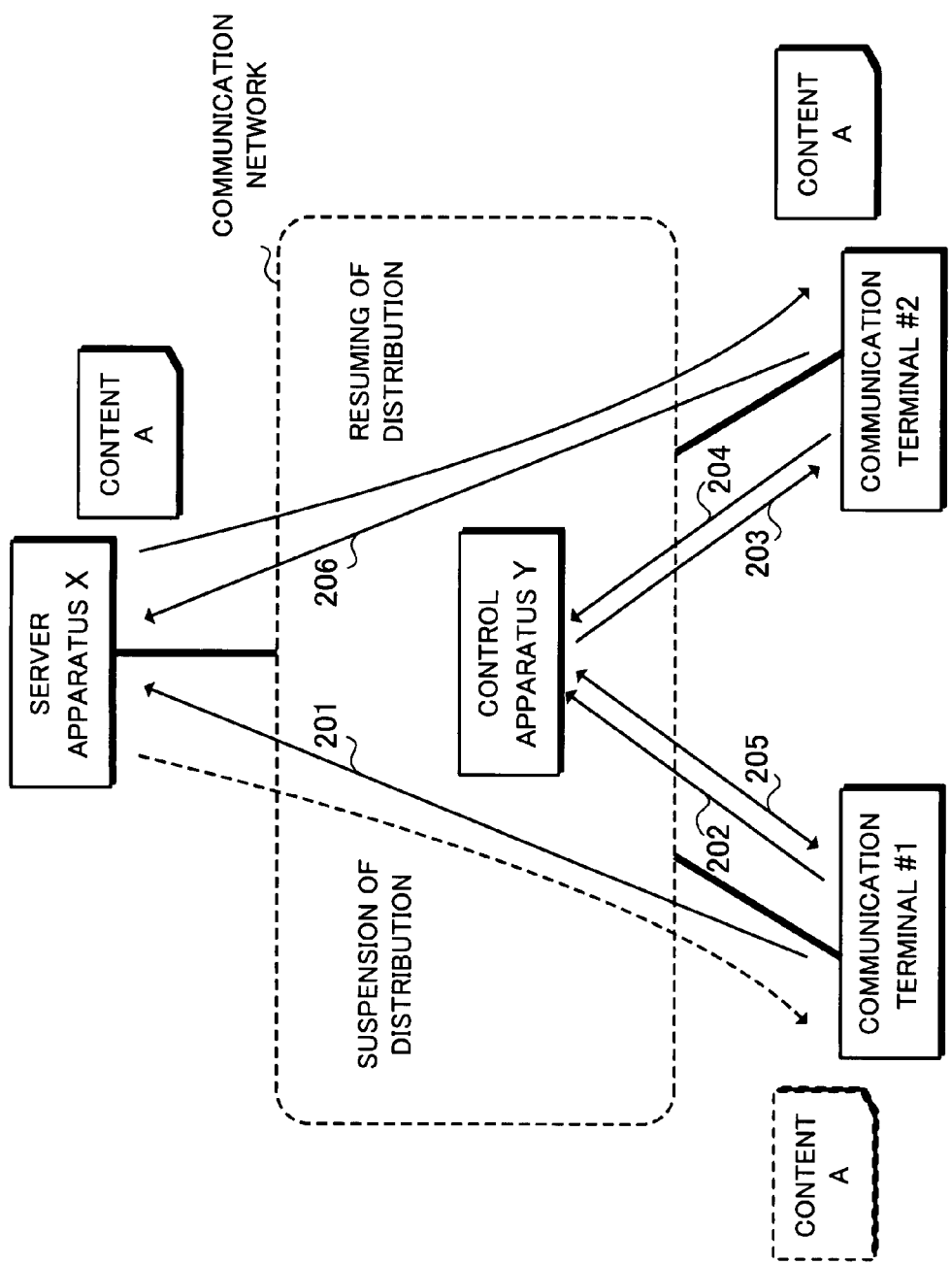
FIG. 7 is a diagram illustrating a second example of terminal switching in the control system of the communication network in conventional technique.

100 Control system of a communication network
110 Transport layer
120 Mobility management section
130 Service management section
150 Base station
160 Communication terminal

The invention claimed is:

1. A communication network control system for switching a communications session from a first communication terminal engaged in performing the communications session with a communicating-apparatus communication terminal to a second communication terminal not presently communicating with the communicating-apparatus communication terminal so that the communications session can be continued using the second communication terminal in place of the first communication terminal, comprising:

a mobility management section configured to set a physical and logical transmission path between communication terminals, and to place a call to the second communication terminal to set a call connection with the second terminal and the communicating-apparatus communication terminal; and a service management section configured to manage the communications session in which data communications are established between applications of connected communication terminals on the transmission path while controlling a start, suspension, and resuming of the communications session between the communication terminals, wherein the service management section is further configured:

to receive a switching request signal from the first communication terminal requesting switching the communications session from the first communication terminal to the second communication terminal, and for then instructing the mobility management section to initiate setting the call connection between the second communication terminal and the communicating-apparatus communication terminal, to notify the second communication terminal of communications session state information of the communications session as executed between the communicating-apparatus communication terminal and the first communication terminal, and to reestablish the communications session between the second communication terminal and the communicating-apparatus communication terminal after transmitting a communications session establishment request to the second communication terminal.

2. The communication network control system according to claim 1, wherein the service management section is further configured to analyze a state of the communications session already established between the communicating-apparatus communication terminal and the first communication terminal based on the state information of the communications session received from the first communication terminal or the state information of the session managed by the service management section, and determines whether switching to the second communication terminal is allowed or not.

3. The communication network control system according to claim 1, wherein the state information of the communications session includes at least one of information indicating a bit rate, media type, codec type, and elapsed time of communications session connection, as states of the communications session, and an application already established between the communicating-apparatus communication terminal and the first communication terminal for the communications session.

4. The communication network control system according to claim 1, wherein the service management section is further configured to analyze processing capabilities and usable applications of the second communication terminal based on terminal information of the second communication terminal included in the switching request signal received from the first communication terminal, and to determine whether switching to the second communication terminal is allowed or not, and when the switching is allowed, selecting an application suitable for the second communication terminal to continue the communications session, while transmitting a communications session establishment request with the application designated to continue the communications session.

5. The communication network control system according to claim 1, wherein the service management section is further configured to acquire terminal information including information indicating processing capabilities of the second communication terminal by searching stored attributes of communication terminals based on an attribute of the second communication terminal, then analyzing processing capabilities and usable applications of the second communication terminal based on the acquired terminal information, and determining whether switching the communications session to the second communication terminal is allowed or not based on analysis results, and when the switching is allowed, selecting an application suitable for the second communication terminal to perform during the continued session connection with the application.

6. The communication network control system according to claim 1, wherein the service management section is configured to analyze a traffic status of the communication network, or usage or vacant status of network resources to determine whether to switch the communications session from the first communication terminal to the second communication terminal.

7. A communication network control system for switching a communications session from a first communication terminal engaged in performing the communications session with a communicating-apparatus communication terminal to a second communication terminal not presently communicating with the communicating-apparatus communication terminal, so that the communications session can be continued using the second communication terminal in place of the first communication terminal, comprising:
   a mobility management section configured to set a physical and logical transmission path between communication terminals; and
   a service management section configured to manage the communications session in which data communications are established between applications of connected communication terminals on the transmission path while controlling a start, suspension, and resuming of the communication session relative to the communication terminals,
   wherein the mobility management section also provides for receiving a request signal requesting a call connection to set a transmission path between the second communication terminal and the communicating-apparatus communication terminal and including a request for switching from the first communication terminal to the second communication terminal from the second communication terminal and for performing the requested call connection of the second communication terminal, and
   wherein the service management section performs managing the communications session by:
      receiving a switching request signal from the first communication terminal,
      receiving and accepting a session establishment request from the second communication terminal based on the received switching request signal, and
      notifying the second communication terminal of state information of the communications session as executed between the communicating-apparatus communication terminal and the first communication terminal to enable the second terminal to then continue the communications session.

8. A communication network control method for switching a communications session from a first communication terminal engaged in performing the communications session with a communicating-apparatus communication terminal to a second communication terminal not presently communicating with the communicating-apparatus communication terminal so that the communications session can be continued using the second communication terminal in place of the first communication terminal, the control method being performed using a communication network control system provided with a mobility management section operable to set a physical and logical transmission path between communication terminals, and to place a call to at least the second communication terminal, and a service management section operable to manage the communications session that includes a state where data communications are established between applications of the communication terminals on the transmission path, while controlling a start, suspension, and resuming of the communications session by transmitting and receiving signals requesting switching of the communications session to/from the second and first communication terminals, the communication network control method comprising the steps of:
   transmitting from the first communication terminal a switching request signal identifying the second communication terminal along with information on the communications session, a state of a communication application used for the communications session, and a history of the communications session to the communication network control system;
   determining whether or not to allow switching from the first communication terminal to the second communication terminal at the communication network control system based on capabilities of the second terminal identified by the switching request signal;
   performing a call connection between the communicating-apparatus communication terminal and the second communication terminal to place the call to the second communication terminal using the mobility management section when the switching of the first and second communication terminals is allowed as a result of the determining step;
   transmitting a communications session establishment request signal including state information of the communications session being executed by the first communication terminal to the second communication terminal using the service management section;
   receiving the communications session establishment request signal at the second communication terminal and setting a state of the communications session to be continued by the second communication terminal based on the state information of the communications session being executed included in the communications session establishment request signal, and then, transmitting an Ack response to the communication network control system; and
   receiving the Ack response in the communication network control system.

9. The communication network control method according to claim 8, further including:
   a step of transmitting, a switching preparation request signal to the second communication terminal from the first communication terminal using a short-distance communication device without passing through the communication network before transmission of the switching request signal, wherein the first communication terminal transmitting the switching preparation request signal transmits the switching request signal after receiving a response signal from the second communication terminal.

10. A communication network control method for switching a communications session from a first communication terminal that is performing the communications session with a communicating-apparatus communication terminal to a second communication terminal not presently performing communications with the communicating-apparatus communication terminal so that the communications session can be continued using the second communication terminal in place of the first communication terminal, the control method being performed using a communication network control system provided with a mobility management section operable to set a physical and logical transmission path between communication terminals, and a service management section operable to manage the communications session that includes a state where data communications are established between applications of the communication terminals on the transmission path, while controlling a start, suspension, and resuming of the communications session by transmitting and receiving signals requesting switching of the communications session to/from the second and first communication terminals, the communication network control method comprising the steps of:

transmitting a switching request signal identifying the second communication terminal from the first communication terminal, the switching request signal including information on the communications session being executed by the first communication terminal, a state of a communication application being used for the communications session, and a history of the communications session to the communication network control system;

determining, whether or not to allow switching from the first communication terminal to the second communication terminal at the communication network control system based on capabilities of the second terminal identified by the switching request signal and notifying a determination result to the first communication terminal;

transmitting, a communications session establishment request signal to the communication network control system from the second communication terminal;

transmitting, a communications session state information notification signal to the second communication terminal from the service management section, and thereby notifying the second communication terminal of state information of the communications session executed between the communicating-apparatus communication terminal and the first communication terminal;

receiving the communications session state information notification signal at the second communication terminal and setting a state of the communications session based on the state information of the communications session executed between the communicating-apparatus communication terminal and the first communication terminal, and then, transmitting an Ack response to the communication network control system; and receiving the Ack response in the communication network control system.

11. The communication network control method according to claim 10, further including:

a step of transmitting a switching preparation request signal to the second communication terminal from the first communication terminal using a short-distance communication device without passing through the communication network before transmission of the switching request signal, wherein the first communication terminal transmitting the switching preparation request signal transmits the switching request signal after receiving a response signal from the second communication terminal.

12. A communication network control method for switching a communications session from a first communication terminal that is performing the communications session with a communicating-apparatus communication terminal to a second communication terminal is not presently performing the communications with the communicating-apparatus communication terminal so that the communications session can be continued using the second communication terminal in place of the first communication terminal, the control method being performed using a communication network control system provided with mobility management section operable to set a physical and logical transmission path between communication terminals and to place a call to at least the second communication terminal, and a service management section operable to manage the communications session that includes a state where data communications are established between applications of the communication terminals on the transmission path, while controlling a start, suspension, and resuming of the communications session by transmitting and receiving signals requesting switching of the communications session to/from the second and first communication terminals, the communication network control method comprising the steps of:

transmitting, from the first communication terminal a communication terminal switching request signal including an identification number of the second communication terminal to the communication network control system;

searching communication terminal attribute information stored in the network control system based on the identification number of the second communication terminal, and determining whether or not to allow communication terminal switching based on the attribution information of the second communication terminal discovered in the searching;

placing the call from the mobility management section to the second communication terminal to establish a call connection between the communicating-apparatus communication terminal and the second communication terminal when the communication terminal switching is allowed as a result of the determination;

transmitting a communications session establishment request signal including state information of the communications session executed by the first communication terminal and information indicating a communications session transfer from the first communication terminal to the second communication terminal;

setting a state of the session based on the state information of the session, and then, transmitting an Ack response to the communication network control system; and receiving the Ack response in the communication network control system.

13. A communication network control method for switching a communications session from a first communication terminal that is performing the communications session with a communicating-apparatus communication terminal to a second communication terminal that is not presently performing communications with the communicating-apparatus communication terminal so that the communications session can be continued using the second communication terminal in place of the first communication terminal, the control method being performed using a communication network control system provided with a mobility management section operable to set a physical and logical transmission path between communication terminals, and to place a call at least to the second communication terminal, and a service management section operable to manage the communications session that includes a state where data communications are established between applications of the communication terminals on the transmission path, while controlling a start, suspension, and resuming of the communications session by transmitting and receiving signals requesting switching of the communications session to/from the second and first communication terminals, the communication network control method comprising the steps of:

- determining communication quality based on a load status of traffic of the communication network or wireless transmission resource status at the communication network control system;
- obtaining an identification number of the second communication terminal at the communication network control system;
- searching attribute information stored in the network control system based on the identification number, and determining whether or not to allow switching to the second communication terminal based on the attribution information discovered in the search at the communication network control system;
- notifying the first communication terminal of information from the communication network control system indicating that the communications session is to be transferred to the second communication terminal when the switching to the second communication terminal is allowed;
- placing the call from mobility management section the to the second communication terminal to establish a call connection between the communicating-apparatus communication terminal and the second communication terminal under control of the mobility management section;
- transmitting to the second communication terminal a communications session establishment request signal including state information of the communications session as executed by the first communication terminal and information indicating a session transfer of the communications session from the first communication terminal to the second communication terminal under control of the service management section;
- setting a state of the session based on the state information of the communications session in the second communication terminal, and then, transmitting an Ack response to the communication network control system; and
- receiving the Ack response in the communication network control system.

* * * * *

UNITED STATES PATENT AND TRADEMARK OFFICE
CERTIFICATE OF CORRECTION

PATENT NO. : 8,023,499 B2
APPLICATION NO. : 11/884310
DATED : September 20, 2011
INVENTOR(S) : Tetsuro Moriwaki et al.

Page 1 of 1

It is certified that error appears in the above-identified patent and that said Letters Patent is hereby corrected as shown below:

ON THE TITLE PAGE:

At item (86), correct the PCT Application Number as follows:

Change "PCT/JP2006/002602" to --PCT/JP2006/302602--.

Insert the following as item (30):

--(30)    Foreign Application Priority Data

Feb. 17, 2005 (JP) ................... 2005-041432--.

Signed and Sealed this
Tenth Day of April, 2012

David J. Kappos
*Director of the United States Patent and Trademark Office*